June 19, 1934.　　F. W. THOMPSON　　1,963,106
GALVANIZING MACHINE
Filed April 2, 1930　　7 Sheets-Sheet 1

INVENTOR
FRANK W. THOMPSON
BY
Ely & Barrow
ATTORNEYS

June 19, 1934.  F. W. THOMPSON  1,963,106
GALVANIZING MACHINE
Filed April 2, 1930  7 Sheets-Sheet 3

INVENTOR
FRANK W. THOMPSON
BY Ely & Barrow
ATTORNEYS

June 19, 1934.  F. W. THOMPSON  1,963,106
GALVANIZING MACHINE
Filed April 2, 1930  7 Sheets-Sheet 4
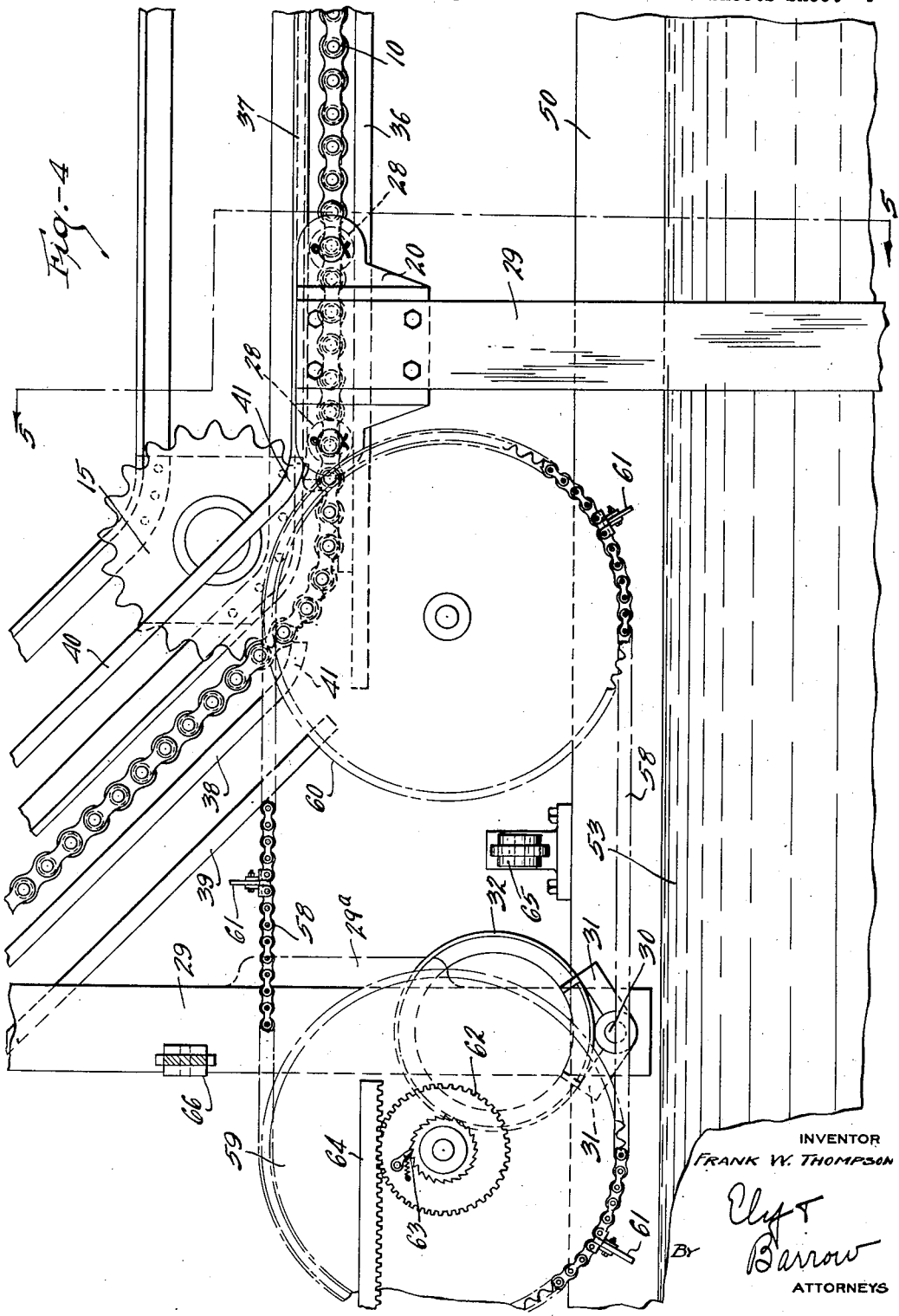

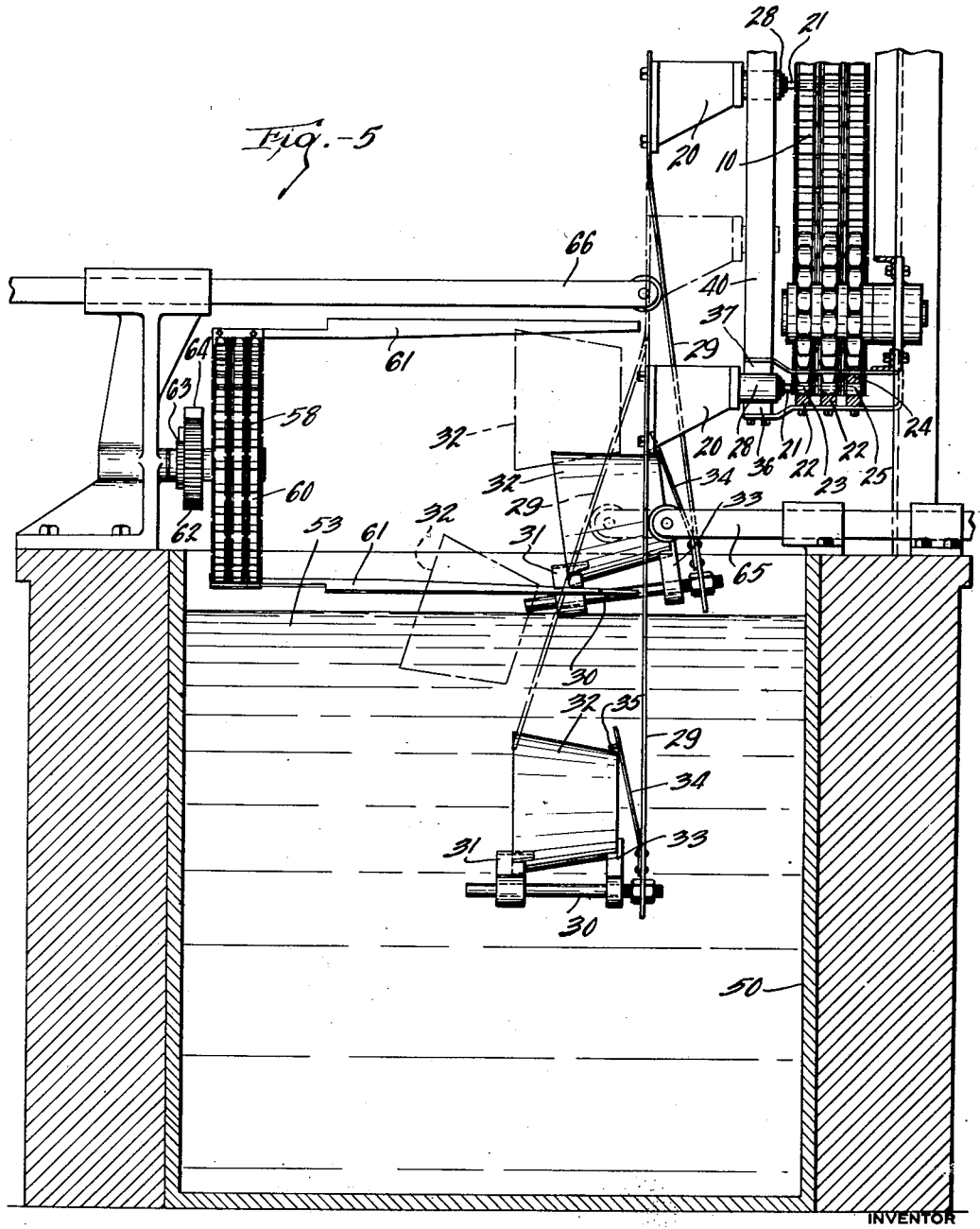

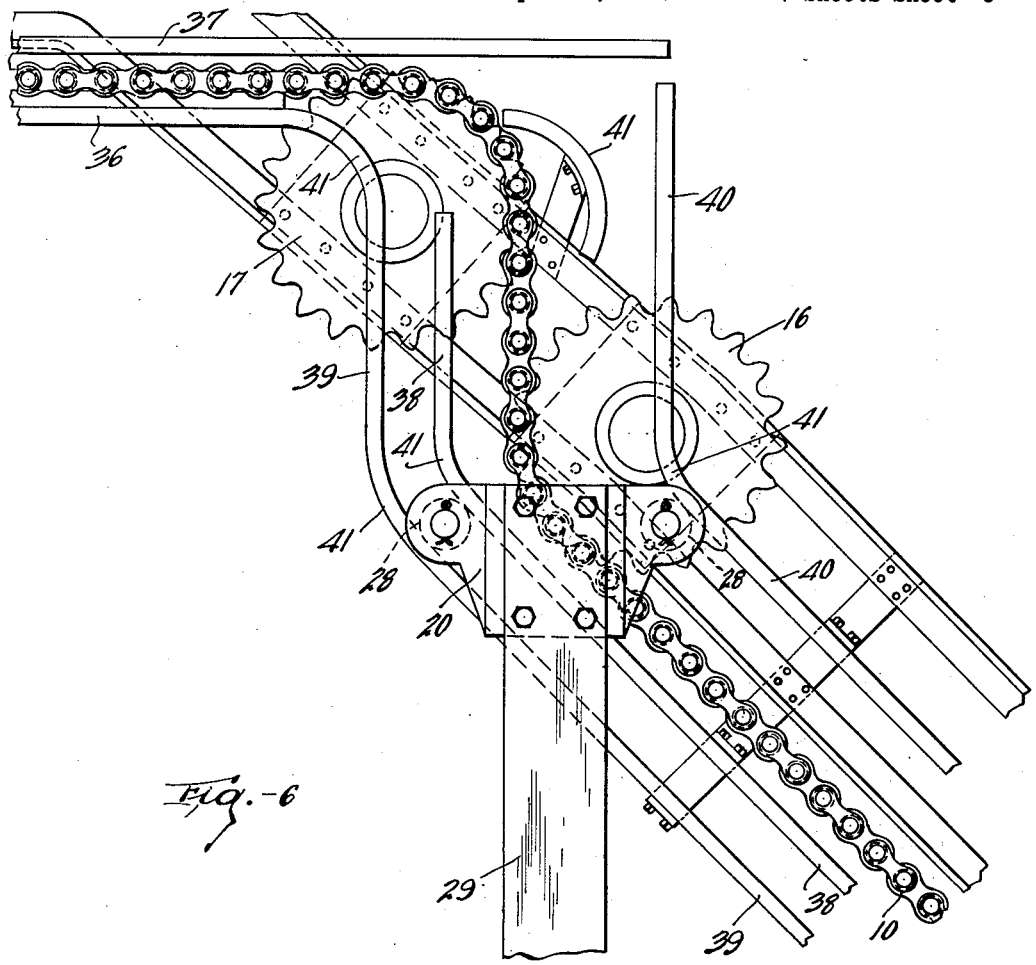

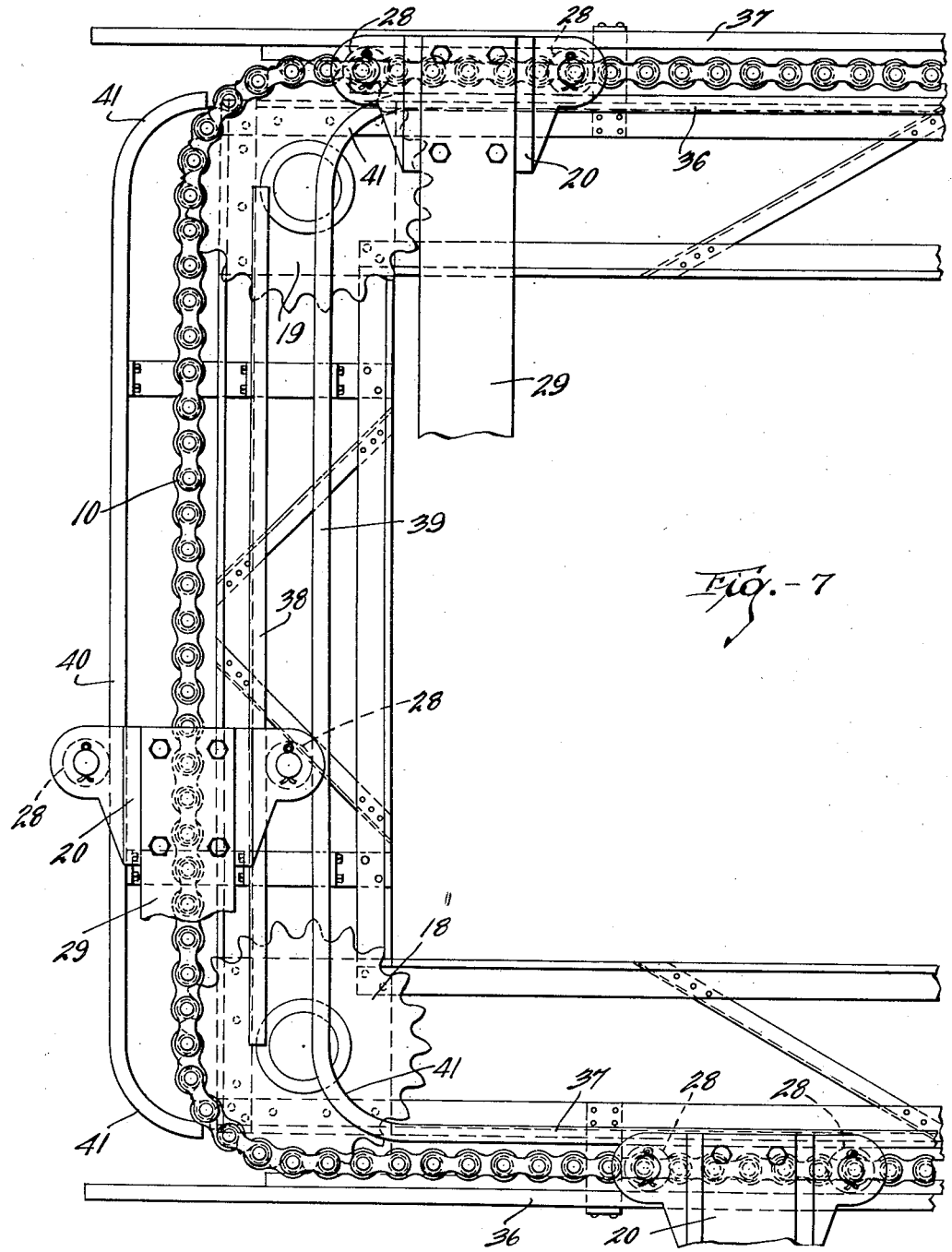

Patented June 19, 1934

1,963,106

UNITED STATES PATENT OFFICE 1,963,106

GALVANIZING MACHINE

Frank W. Thompson, New Philadelphia, Ohio, assignor to The Reeves Manufacturing Company, Dover, Ohio, a corporation of Ohio Application April 2, 1930, Serial No. 440,954

15 Claims. (Cl. 91—12.6)

This invention relates to apparatus for applying metal coatings such as zinc, tin or the like to hollow metal ware such as pails or other receptacles.

In the manufacture of hollow metal ware such as pails, machines have heretofore been devised for the purpose of submerging the articles to be coated in a bath of the molten metal, the articles being tilted in passing them into and from the bath in such a way as to secure a uniformly and smoothly coated article without discolored or roughened areas caused by scale, oxides, or other foreign matter upon the surface of the metal. These machines have, however, not been entirely satisfactory because so far they have been of a complicated construction not capable of effective operation and hand dipping of hollow metal ware is still being resorted to.

The present invention has for its object the provision of a simple, effective apparatus for passing hollow metal ware through a coating bath in the required way to produce the above-described results.

The invention particularly contemplates an improved conveyor, means for carrying the articles into and out of the coating bath, and mountings for receiving the hollow articles on the conveyor made of flexible material together with means associated with the conveyor for engaging and flexing the mountings at the points where the articles are to be tilted.

The foregoing and other objects of the invention are attained in the pail galvanizing apparatus illustrated in the accompanying drawings and described below. It is to be understood that the invention is not limited to the specific form thereof shown and described.

Of the accompanying drawings,

Figure 4 is an enlarged side elevation of part of the apparatus at and immediately above the left end portion of the galvanizing tank;

Figure 5 is a section on line 5—5 of Figure 4;

Figure 6 is an enlarged side view of the apparatus further to the left above the tank; and Figure 7 is an enlarged side view of the left end of the apparatus.

Figure 1:
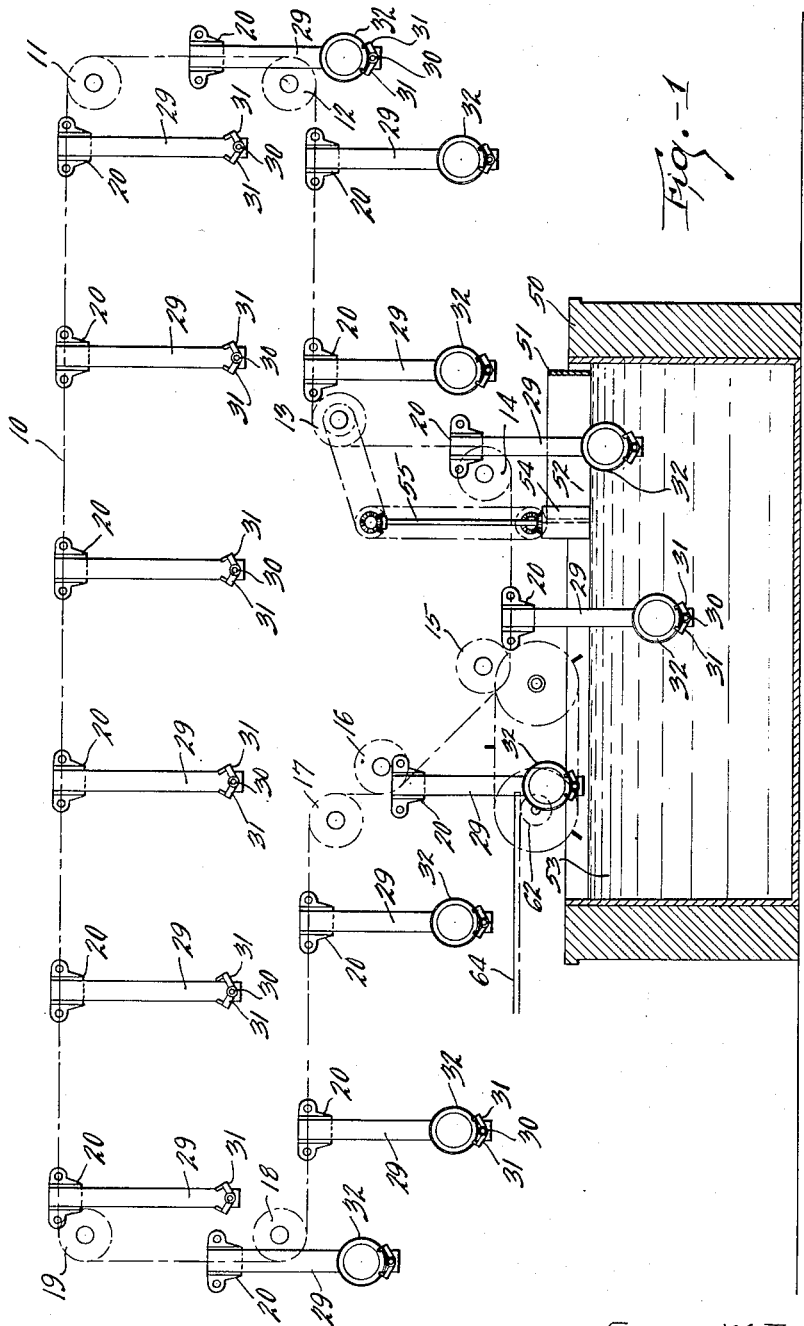
Figure 1 is a side elevation, more or less diagrammatic and partly in section illustrating an apparatus embodying the invention.

Referring to the drawings, a conveyor 10 preferably of triple roller chain is trained over sprockets 11, 12, 13, 14, 15, 16, 17, 18 and 19, any one of which may be driven by suitable means (not shown). On one side of chain 10 at regular intervals brackets 20 are pivotally mounted as by use of an extended link pin 21 the chain along its horizontal and inclined stretches preferably being supported by tracks 22, 22 supporting two of its series of rollers 23 adjacent its front side and a track 24 engaging the upper sides of the other series of rollers 25 to prevent transverse tilting or rocking of the chain.

The pivoted brackets 20 are provided with rollers 28, 28 at the ends thereof which are arranged to cooperate with tracks to be described to maintain the brackets in a vertical position throughout the path of their travel on the conveyor. Depending from the brackets are flat strips 29 of flexible material on the front of which at their bottoms there are secured forwardly projecting bars 30 on which are secured a pair of circumferentially spaced hooks 31, 31 for engaging over the lip of a pail 32 and rearwardly of said hooks are circumferentially spaced members 33, 33 for supporting pail 32 at its rear so that the pail will be mounted with its axis in a horizontal plane transversely of its path of travel. A strip of spring material 34 is arranged on the supporting strip 29 so as normally to be urged outwardly to contact with the upper edge of the bottom of a pail 32 supported by hooks 31 and members 33. The springs 34 may have a projection thereon as at 35 to engage over the pail 32 to assist in preventing its displacement.

The tracks for guiding the pivoted brackets 20 comprise tracking suitably arranged to provide closely spaced rails such as 36 and 37 on all horizontal stretches spaced apart to distance equal to the diameter of rollers 28 with sufficient clearance for free action and between which both rollers 28—28 engage. On vertical and inclined stretches similarly spaced rails 38 and 39 are arranged to guide one of the rollers 28 and a third rail 40 is arranged to engage the other roller 28 to positively hold the brackets 20 in a vertical position. At the curves, curved sections 41 of tracking are used to guide the brackets 20 in vertical positions about the same, the curved sections at each curve being parallel to each other, the outer roller 28 as the brackets go about each curve, being engaged by curved tracking at the inner side of the roller to prevent cocking of the brackets.

Figure 2:
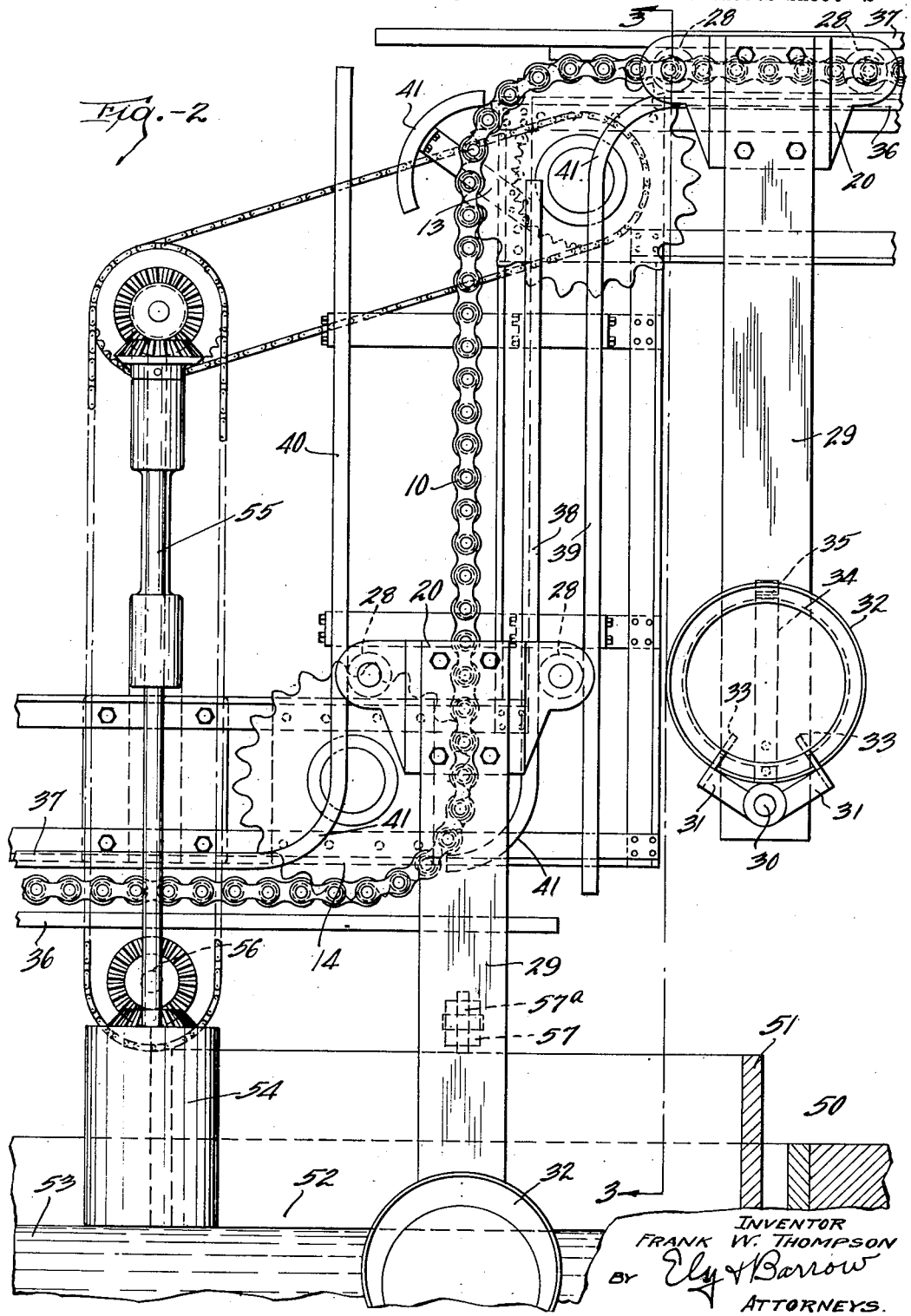
Figure 2 is an enlarged side view of the portion of the apparatus at and above the right end of the galvanizing tank.

The tank for the molten zinc is shown at 50 and is provided with a flux box 51 through which the articles to be treated are to pass into the tank, the flux material 52 floating in this box on the surface of the molten metal 53. This flux box is arranged under the vertical stretch of the conveyor 10 at the right end of the tank 50 and the box at its left end is in part closed by a pair of rollers 54, 54 between which the strips 29 are adapted to pass from the flux box as the articles are being conveyed through tank 50, the rollers 54 yielding sufficiently to permit the passage of the thin flexible strips 29. One of these rollers 54 may be driven by a shaft 55 through suitable gearing, the shaft being in turn driven from some part of the conveyor system 10 in any suitable way (Figure 2), and the other roller 54 being driven by a shaft 56 through suitable gearing, the shaft 56 also being driven from some part of the conveyor system 10, the shafts 55 and 56 being so arranged as not to interfere with passage of the article supporting strips 29.
In order to rearwardly tilt the articles as they pass beneath the level 53 of the molten metal to prevent any foreign matter becoming lodged on the upper inner portion of the article, an element 57 is arranged to be moved in cooperation with the pail supporting strips 29 in succession to flex these strips forwardly, (Figure 3), this element being reciprocable in any suitable way in timed relation to the speed of conveyor 10 and preferably having a roller 57a thereon to engage the strips 29. It will be noted that downward travel of conveyor 10 while element 57 is projected forwardly in engagement with a strip 29 causes the degree of tilting to increase to a maximum until the pail is completely below the surface 53. (Note succession of positions of pail in dotted lines (Figure 3).)

The inclined stretch of conveyor 10 over the left end of the tank 50 is designed to convey the articles from the tank. Means are preferably provided at this point to keep the surface 53 of the molten metal free of skim to prevent its adherence to the coated articles. This means comprises an endless chain 58 arranged over sprockets 59 and 60 at the front side of the machine and provided with wipers or scrapers 61, 61 projecting rearwardly thereof and so arranged that in traveling along the lower stretch of chain 58 they will scrape scum from the surface 53, the spacing of scrapers 61 being such that when the device is not in operation the spaces between the scrapers will permit passage of the supports 29 with the pails thereon up out of tank 50 without interference. The chain 58 may be intermittently driven in timed relation to the conveyor so that said device may be actuated between each passage of a pail from the tank. For this purpose a gear 62 on the shaft of one of the sprockets (sprocket 59) may be arranged to be clutched thereto during operation of gear 62 in one direction by a ratchet or other suitable clutch device 63, gear 62 being driven in alternate directions by a reciprocating rack 64 in turn reciprocated in timed relation with conveyor 10 in any suitable way (not shown). The gear 62 will accordingly idle when turned in the other direction.

The effective removal of the articles from the bath of molten metal requires tilting of the pails first upwardly as they pass up out of the molten metal and then downwardly to pour the molten metal from the pails. The first of these operations may be performed by an element 65 similar to element 57 and arranged at the rear of the apparatus to be projected forwardly against the strips 29 in succession. The downward tilting of the pails can be accomplished by a similar element 66 arranged at the front of the apparatus to be projected rearwardly. These are timed to operate at the desired positions, the lower element 65 first flexing and disengaging from the strips 29 before the upper element 66 engages.

As will be apparent from Figure 5, the general movement of the supports 29 upwardly while the elements 65 or 66 are engaged therewith causes the pails gradually to reassume their normal position before finally released. Since the inclined stretch of the conveyor 10 effects a longitudinal as well as an upward movement of the supports 29 it is necessary that these be sufficiently wide to insure proper engagement of elements 65 and 66 during the time required or the strips 29 may be widened at 29a as shown to accomplish the purpose.

Figure 3:
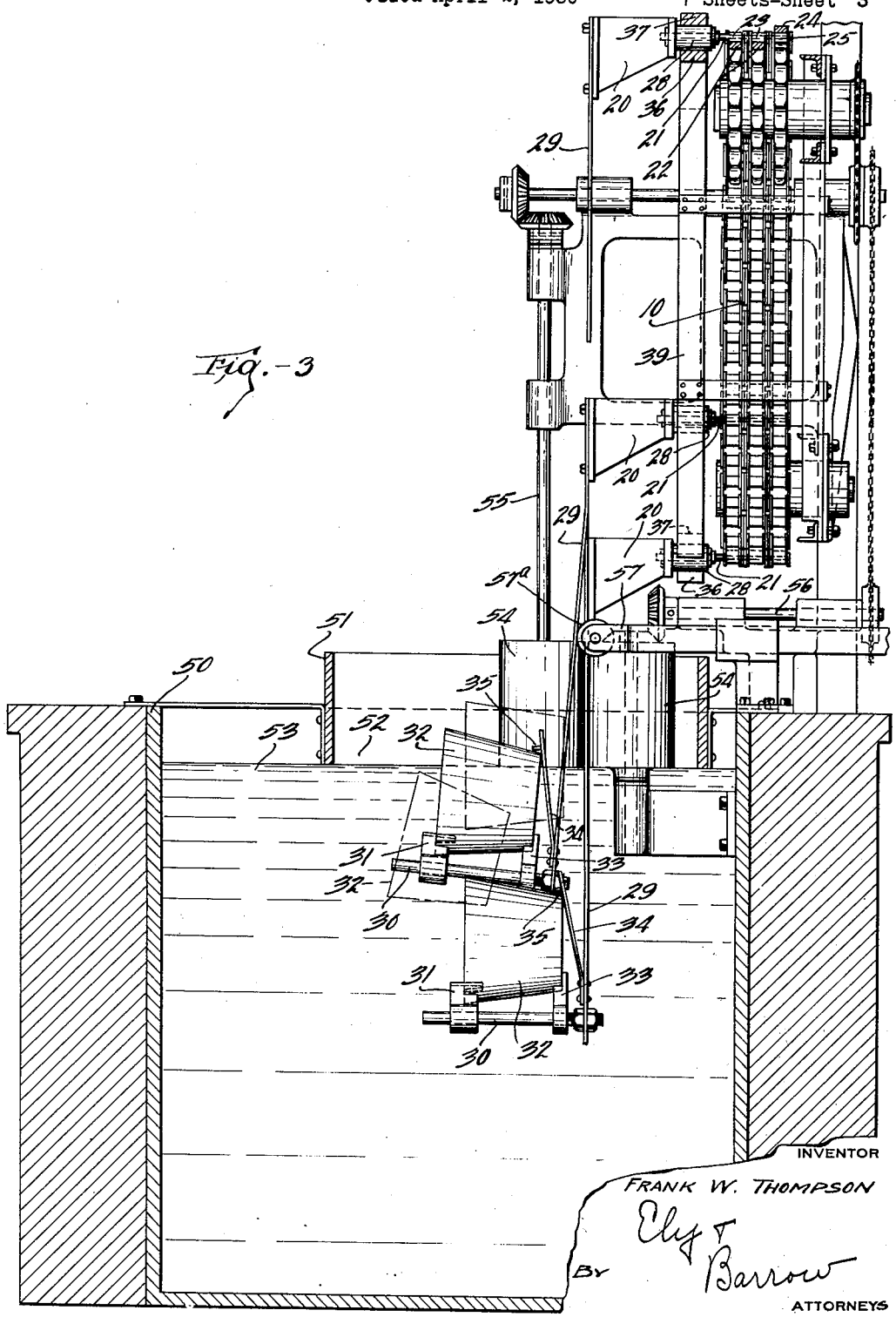
Figure 3 is a section on line 3—3 of Figure 2.

The operation of the machine will be readily understood from the foregoing, it being driven continuously, pails to be galvanized being mounted in the holders on strips 29 at some suitable point along the conveyor, the pails being conveyed down through flux box 51 into the tank 50 and being upwardly tilted as they pass therein, as shown in Figure 3, the pails then passing longitudinally of tank 50, strips 29 passing between rolls 54 out of the flux box, and the pails being first upwardly and then downwardly tilted as they pass out of the bath of molten metal, the surface of which at this point is kept clean by scrapers 61, 61.

Obviously modifications of the invention may be resorted to without departing from the spirit thereof or the scope of the appended claims.

What is claimed is:

1. A device for coating hollow metal ware with a metal comprising a conveyor, supports on the conveyor, said supports including pivoted brackets, track means engaging the brackets to guide the brackets in vertical positions along the conveyor, said supports also including flat flexible elements depending from the brackets, means on the flexible elements for supporting a hollow metal ware article with its axis normally horizontal and transversely of the path of the conveyor, a tank for the coating material, said conveyor having a downwardly extending stretch above said tank, a flux box in the tank under said downwardly directed stretch, through which the articles are passed into the tank, means for flexing the flexible elements in succession to tilt the articles upwardly as they pass down into the coating liquid, said conveyor having a longitudinal stretch to convey the articles through the tank, said flux box including a pair of rollers between which said flexible elements pass flatwise as they are moved along said longitudinal stretch, said conveyor having an upwardly extending stretch for conveying the articles from the tank, means for engaging and flexing the flexible elements in succession as the articles pass up through the level of the coating material to tilt the articles upwardly, and means for engaging and flexing the flexible elements in succession as the articles pass out of the coating material to tilt the articles downwardly.

2. A device for coating hollow metal ware with a metal comprising a conveyor, supports on the conveyor, said supports including pivoted brackets, track means engaging the brackets to guide the brackets in vertical positions along the conveyor, said supports also including flexible elements depending from the brackets, means on the flexible elements for supporting a hollow metal ware article with its axis normally horizontal and transversely of the path of the conveyor, a tank for the coating material, said conveyor having a downwardly extending stretch above said tank, means for flexing the flexible elements in succession to tilt the articles upwardly as they pass down into the coating liquid, said conveyor having a longitudinal stretch to convey the articles through the tank, said conveyor having an upwardly extending stretch for conveying the articles from the tank, means for engaging and flexing the flexible elements in succession as the articles pass up through the level of the coating material to tilt the articles upwardly, and means for engaging and flexing the flexible elements in succession as the articles pass out of the coating material to tilt the articles downwardly.

3. A device for coating hollow metal ware with a metal comprising a conveyor, supports on the conveyor, pivoted brackets, track means engaging the brackets to guide the brackets in vertical positions along the conveyor, said supports also including flat flexible elements depending from the brackets, means on the flexible elements for supporting a hollow metal ware article with its axis normally horizontal and transversely of the path of the conveyor, a tank for the coating material, said conveyor having a downwardly extending stretch above said tank, a flux box in the tank under said downwardly directed stretch, through which the articles are passed into the tank, means for flexing the flexible elements in succession to tilt the articles upwardly as they pass down into the coating liquid, said conveyor having a longitudinal stretch to convey the articles through the tank, said flux box including a pair of rollers between which said flexible elements pass flatwise as they are moved along said longitudinal stretch, said conveyor having an upwardly extending stretch for conveying the articles from the tank, means for engaging and flexing the flexible elements in succession as the articles pass up through the level of the coating material to tilt the articles upwardly, and means for engaging and flexing the flexible elements in succession as the articles pass out of the coating material to tilt the articles downwardly.

4. A device for coating hollow metal ware with a metal comprising a conveyor, supports on the conveyor, pivoted brackets, track means engaging the brackets to guide the brackets in vertical positions along the conveyor, said supports also including flexible elements depending from the brackets, means on the flexible elements for supporting a hollow metal ware article with its axis normally horizontal and transversely of the path of the conveyor, a tank for the coating material, said conveyor having a downwardly extending stretch above said tank, means for flexing the flexible elements in succession to tilt the articles upwardly as they pass down into the coating liquid, said conveyor having a longitudinal stretch to convey the articles through the tank, said conveyor having an upwardly extending stretch for conveying the articles from the tank, means for engaging and flexing the flexible elements in succession as the articles pass up through the level of the coating material to tilt the articles upwardly, and means for engaging and flexing the flexible elements in succession as the articles pass out of the coating material to tilt the articles downwardly.

5. A device for coating hollow metal ware with a metal comprising a conveyor, supports on the conveyor, pivoted brackets, track means engaging the brackets to guide the brackets in vertical positions along the conveyor, said supports also including flat flexible elements depending from the conveyor, means on the flexible elements for supporting a hollow metal ware article, a tank for the coating material, said conveyor having a downwardly extending stretch above said tank, a flux box in the tank under said downwardly directed stretch, through which the articles are passed into the tank, said conveyor having a longitudinal stretch to convey the articles through the tank, said flux box including a pair of rollers between which said flexible elements pass flatwise as they are moved along said longitudinal stretch, said conveyor having an upwardly extending stretch for conveying the articles from the tank.

6. In a machine for coating hollow metal ware, the combination of a conveyor for passing the articles down into and up out of the tank, means at the point where the articles pass up out of the tank for scraping the scum off the coating material, said means comprising an endless chain having spaced scrapers supported thereon, and means for intermittently driving said chain during the intervals between the successive passing of articles up out of the tank, said scrapers being so arranged thereon that room is provided to permit passing of the articles therebetween while the scrapers are not functioning.

7. The combination in apparatus for coating hollow metal ware of a conveyor for passing the articles into and out of the tank, flexible elements mounting the articles on the conveyor, means for engaging and flexing the flexible elements to tilt the articles upwardly as they pass into the tank, and a plurality of means for engaging and flexing said elements as they pass to tilt the articles first upwardly and then downwardly as they pass out of the tank.

8. The combination in apparatus for coating hollow metal ware of a conveyor for passing the articles into and out of the tank, flexible elements mounting the articles on the conveyor, means for engaging and flexing the flexible elements to tilt the articles as they pass into the tank, and means for engaging and flexing said elements to tilt the articles as they pass out of the tank.

9. The combination in apparatus for coating hollow metal ware of a conveyor for passing the articles into and out of the tank, flexible elements mounting the articles on the conveyor, and means for engaging and flexing the flexible elements to tilt the articles.

10. The combination with means for supporting and moving a hollow article relative to a tank of coating material, said means including an element of flexible material, of means for engaging and flexing said element to tilt the article as it moves relative to the surface of said coating material.

11. The combination with means for supporting and moving a hollow article relative to a tank of coating material, said means including an element of flexible material, of means for engaging and flexing said element to tilt the article as it moves relative to the surface of said coating material, said supporting and moving means and said flexing means being relatively movable when engaged, whereby the angle of tilt gradually changes.

12. The combination with means for supporting and continuously moving a series of hollow articles relative to a tank of coating material, said means including elements of flexible material, of means for engaging and flexing said elements in succession to tilt the articles as they move relative to the surface of said coating material.

13. The combination with means for supporting and continuously moving a series of hollow articles relative to a tank of coating material, said means including elements of flexible material, of means for engaging and flexing said elements in succession to tilt the articles as they move relative to the surface of said coating material, said supporting and moving means and said flexing means being relatively movable when engaged, whereby the angle of tilt gradually changes.

14. The combination in a metal coating apparatus of a tank for the coating bath, a flux box in said tank and conveying means for passing articles to be coated down into the tank through the flux box, and then along the tank through the coating bath, said conveying means having article supports thereon adapted to pass down into the flux box and said flux box having yieldingly closed means in one wall thereof adapted to be opened by the supports to permit said supports to pass out of the box.

15. The combination in a metal coating apparatus of a tank for the coating bath, a flux box in said tank, conveying means for passing articles down into the tank through the flux box and then along the tank through the coating bath, said conveyor having article supports thereon passing down into the flux box and said flux box having a wall adapted to permit said supports to pass therethrough from the flux box.

FRANK W. THOMPSON.